Figure 3:
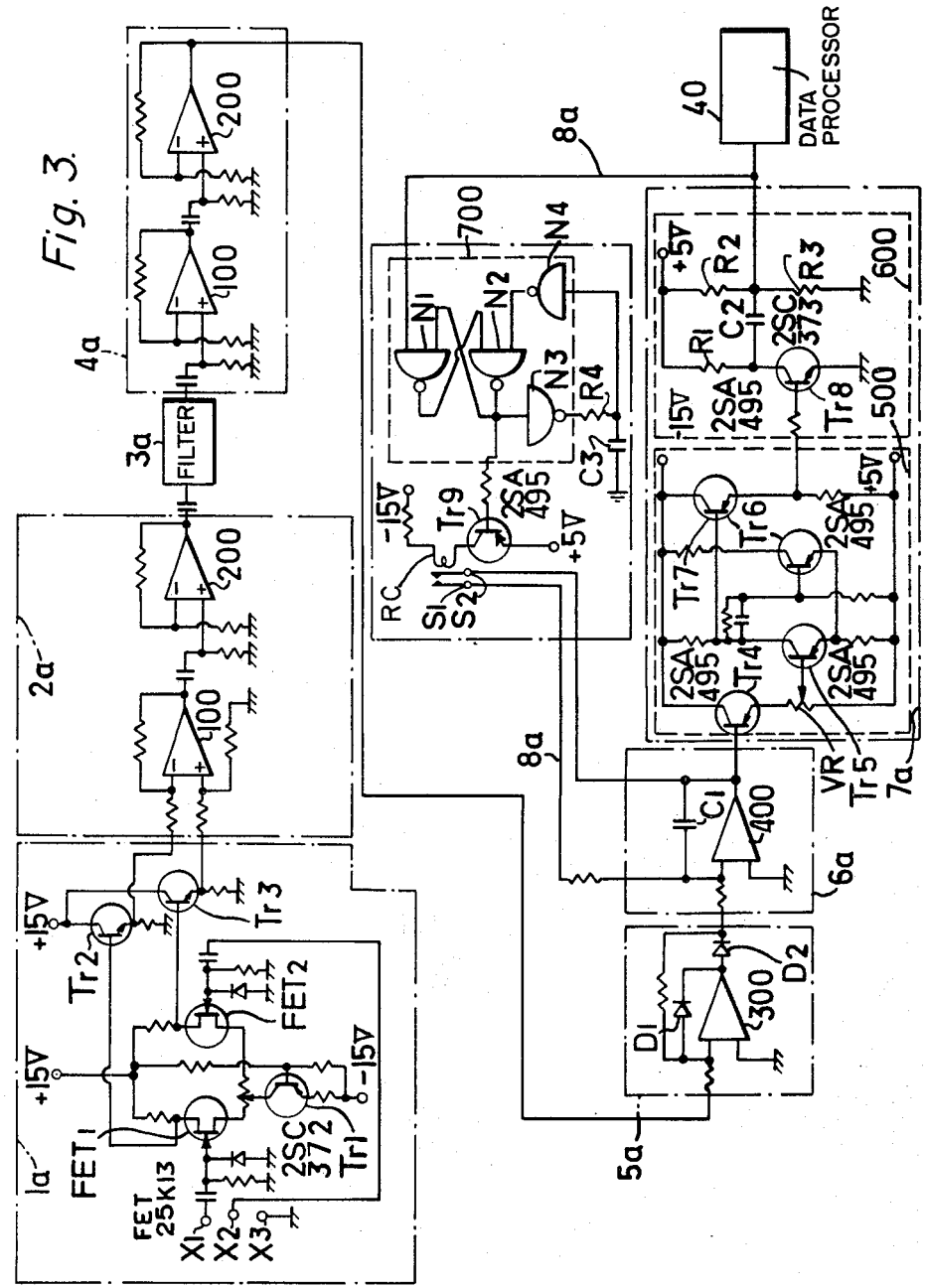

United States Patent [19]

Hakata et al.

[11] 3,774,593

[45] Nov. 27, 1973

[54] METHOD OF AND APPARATUS FOR SLEEP MONITORING BY BRAINWAVE, ELECTROMYOGRAPHIC AND EYE MOVEMENT SIGNALS

[75] Inventors: Hiroshi Hakata; Katumi Higuchi, both of Nara; Masao Kozeni, Osaka, all of Japan

[73] Assignee: Shionogi & Co., Ltd., Osaka-shi, Osaka-fu, Japan

[22] Filed: Dec. 27, 1971

[21] Appl. No.: 212,340

[30] Foreign Application Priority Data
Dec. 29, 1970  Japan.............................. 45/126284

[52] U.S. Cl......... 128/2.1 B, 128/2.1 R, A61b/5/04
[58] Field of Search........................ 128/2.1 B, 2.1 R

[56] References Cited
UNITED STATES PATENTS

| | | | |
|---|---|---|---|
| 3,123,768 | 3/1964 | Burch et al...................... | 128/2.1 B |
| 2,950,352 | 8/1960 | Belck.............................. | 128/2.1 B |
| 3,185,925 | 5/1965 | Grass............................... | 128/2.1 B |
| 3,548,812 | 12/1971 | Paine............................... | 128/2.1 B |
| 2,933,364 | 4/1960 | Campbell......................... | 128/2.1 B |
| 3,217,706 | 11/1965 | Sullivan........................... | 128/2.1 R |
| 3,641,993 | 2/1972 | Gaavder et al.................. | 128/2.1 R |

FOREIGN PATENTS OR APPLICATIONS

| | | | |
|---|---|---|---|
| 1,115,018 | 5/1968 | Great Britain................... | 128/2.1 B |

*Primary Examiner*—William E. Kamm
*Attorney*—E. F. Wenderoth et al.

[57] ABSTRACT

An apparatus for monitoring the behavior during sleep of a living organism for measuring the mental condition of the living organism while the latter is sleeping, which essentially comprises an analog-to-digital signal conversion device for electroencephalograms, movements of the eyes and electromyograms, a data processor for processing the output signals from the conversion device and a tape recorder for recording the signals indicative of the electroencephalograms, the eye movements and the electromyograms. Also provided is a method of monitoring the behaviour during which can be performed by the apparatus herein proposed.

11 Claims, 16 Drawing Figures

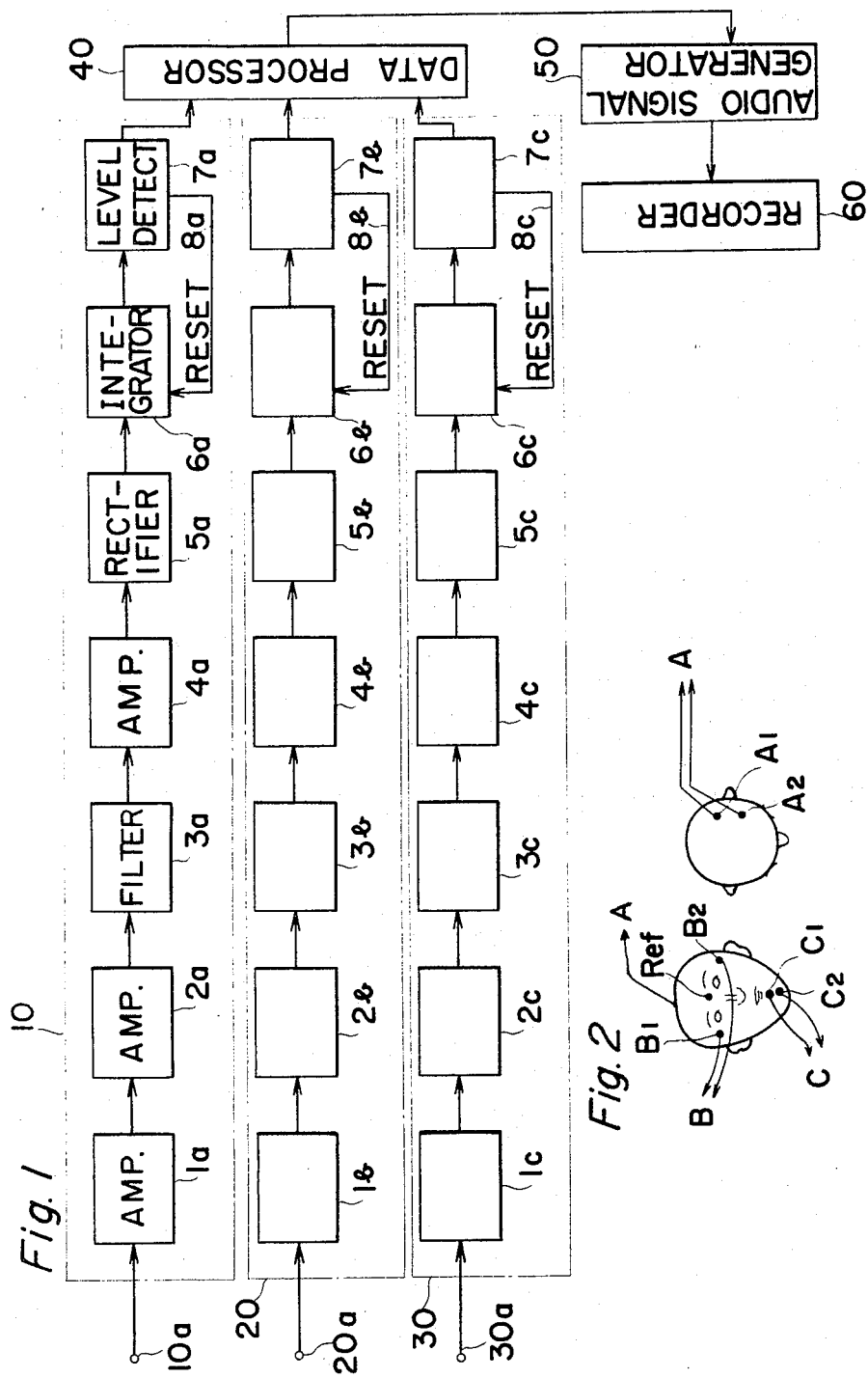

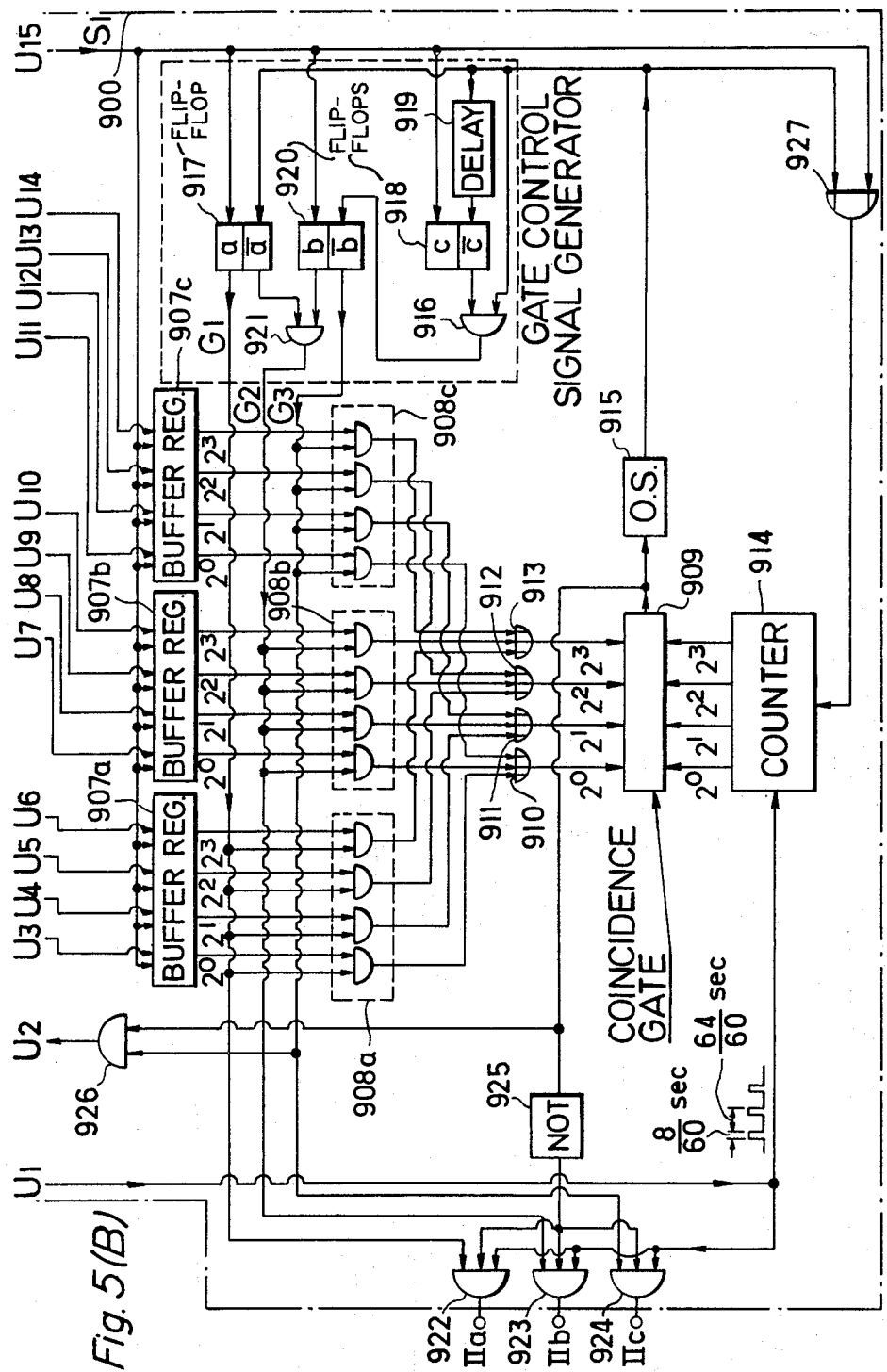

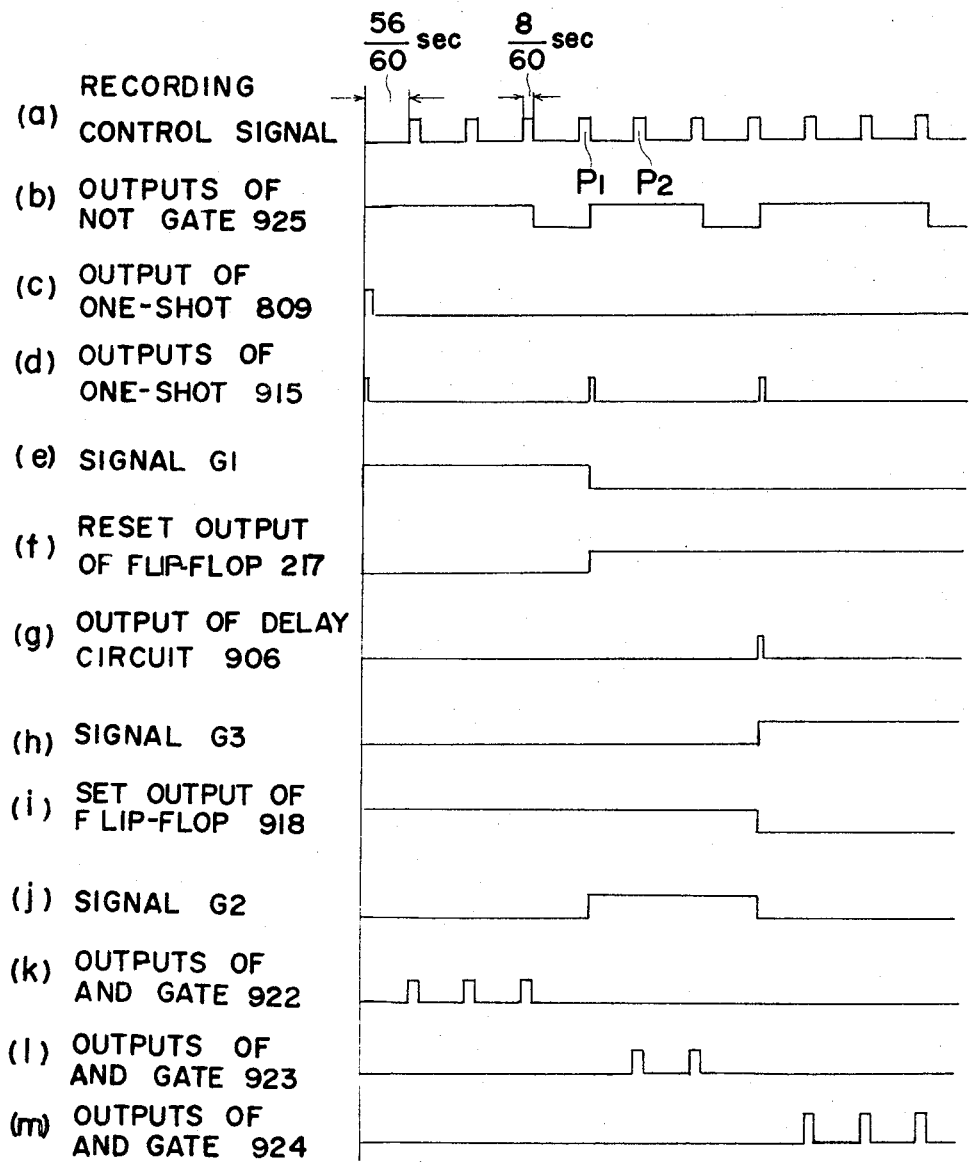

Fig. 12
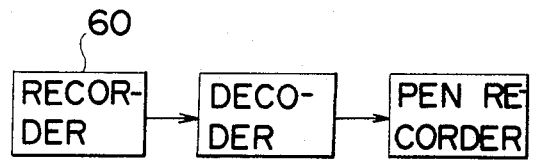
Fig. 13
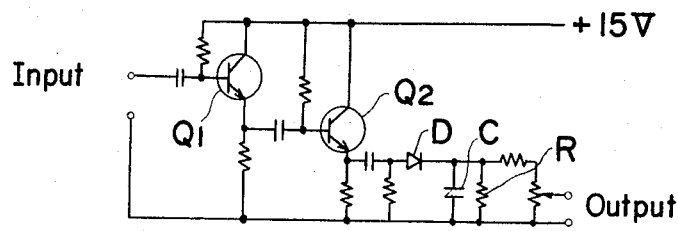
Fig. 14  (A)  (B)
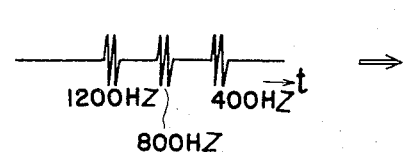  ⇒  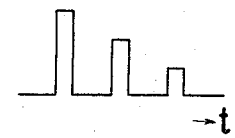
Signal From
Tape Recorder
Signal Recorded by
Pen Recorder

METHOD OF AND APPARATUS FOR SLEEP MONITORING BY BRAINWAVE, ELECTROMYOGRAPHIC AND EYE MOVEMENT SIGNALS

The present invention relates to a sleep monitoring apparatus of the kind used to analyze the behaviour during sleep of a living organism for the purpose of psychological analysis, medical treatment of the living organism and the like.

The present invention also pertains to a method of monitoring the behaviour of sleep during a living organism which can be satisfactorily performed with the use of the sleep monitoring apparatus herein proposed.

It has been well recognized that the sleeping pattern of a living organism varys from subject to subject and that the analysis of this sleeping pattern is of great importance in terms of psychoanalysis, medical treatment of the patient and the like. Heretofore, the monitoring of the sleep pattern has been largely performed by making electroencephalograms of brain waves.

In addition thereto, the analysis of dreaming has been recently proposed to determine the mental condition of the living organism, i.e., a human being. In this case, it has been said that the eye movements and the electromyograms of the subject to be tested should be studied in view of the fact that rapid movements of the eyes of the subject have been found to take place when the subject dreams while sleeping and there is a reduction in the level of the electromyograms. In the case of an animal, it has been found that the level of electromyograms from the cervical region becomes substantially zero during dreaming.

According to the conventional sleep monitoring method, for example, in which an electroencephalograph or brain wave measuring device is employed, a natural sleep condition in which the subject to be tested can sleep free of mental stress cannot be created because of the fact that the instrument is so bulky that a special laboratory facility in which the subject is placed to sleep is required. If the subject is compelled to sleep under such circumstance, there is a tendency for the mental condition of the subject to be oftentimes distorted and, therefore, reliable information concerning the sleep pattern of the subject cannot be obtained.

In addition, according to the conventional sleep monitoring method, the operator of the instrument is also compelled to work night and day for taking care of the instrument, for example, what with supplying ink to the pen recorder unit of the instrument and what with checking the recording paper which may run up to some four or five hundred meters.

Furthermore, an analysis of the recording paper of such length is a laborious and time consuming job and oftentimes requires an expert having sufficient knowledge in this field of art.

Accordingly, an essential object of the present invention is to provide a novel sleep monitoring apparatus which makes possible the elimination of the above mentioned disadvantages and inconveniences inherent in the conventional sleep monitoring method.

Another object of the present invention is to provide a novel apparatus of this kind wherein the sleep monitoring can be carried out by reference to the electroencephalograms, the eye movements and the electromyograms (hereinafter referred to as EEG, EM and EMG, respectively) of the subject to be tested thereby to determine the sleeping pattern of the subject.

A further object of the present invention is to provide a novel apparatus of this kind wherein the EEG, EM and EMG signals detected from the sleeping subject are respectively recorded by a commercially available tape recorder in the form of discrete pulses each having a frequency within the audible range.

A still further object of the present invention is to provide a novel apparatus of this kind wherein the tape recorder employed for recording the EEG, EM and EMG signals has a very simple structure so that the apparatus itself can be easily transported from place to place as desired to effect the recording of the sleeping pattern of the subject under circumstances in which the subject is in a natural sleep condition in which he does not feel mentally stressed.

A still further object of the present invention is to provide a novel apparatus of this kind wherein the data analysis to determine the sleeping pattern of the subject can be easily performed with reference to an existing criterion without necessitating a higher level of knowledge.

A still further object of the present invention is to provide a method for monitoring the sleep behaviour of the subject by the use of the apparatus herein proposed.

A still further object of the present invention is to provide a method for monitoring the sleep behaviour of the subject which comprises a minimum number of steps so that the method can be easily performed by the apparatus herein proposed.

According to the present invention, the original EEG, EM and EMG signals detected from portions of the body of a living organism through suitable electrodes detachably secured on such portions of the body are respectively fed to level detectors through individual channels by means of integrators. The level detectors are adapted to monitor the outputs from the integrators, respectively, in such a way that, each time the output from each of the integrators attains a preselected value, the corresponding one of the detectors generates a reset signal which is supplied to the integrator causing the integrator to be reset. On the other hand, each of the level detectors operates to apply a signal representative of the reset frequencies of the integrator to a data processor by which the reset frequencies can be counted. The reset frequency counted by the data processor is nevertheless in proportion to the integral valve of the original signal, namely, the amplitude of the original output signal of the integrator.

The data processor is also operative to divide the monitoring period into a plurality of equal intervals each of which may be varied as desired and, therefore, if the reset frequencies during each interval of the monitoring period are counted by the data processor, variations in the level of the original signal can be observed with respect to the time elapsed. However, it is to be noted that the value of the reset frequencies counted during each interval is a mean value of the original signal obtained during such interval, and, therefore, in the event that the length each interval is selected to be too long, rapid variation in the EEG and/or EMG signals cannot be detected. In any event, even if such rapid variations take place, these may be neglected as aberrations in the data analysis. According to the present invention, the apparatus is designed such that the length of each interval can be selected to be from 1 minute to 10 minutes. However, care must be taken in selecting the value of each interval of the monitoring period in view of the quality of each of the original EEG, EM and EMG signals and the purpose of the analysis of the data obtained by the apparatus of the present invention.

Figure 8:
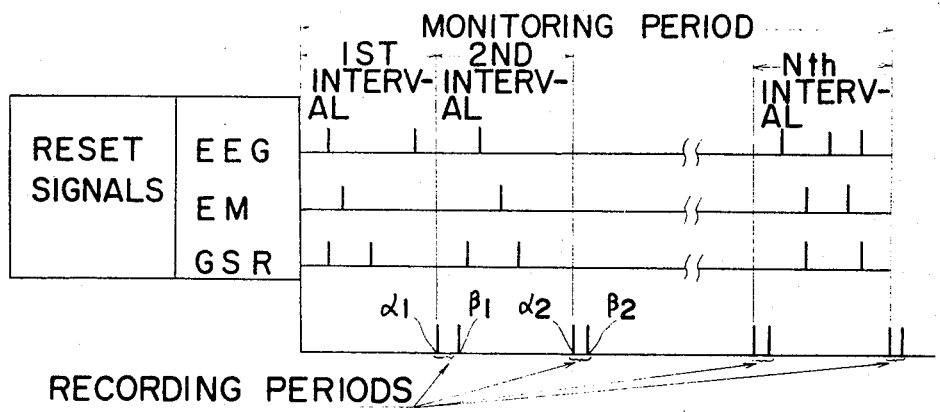

Furthermore, according to the present invention, as shown in FIG. 8, if the length of each interval is selected to be 10 minutes and the period during which the tape recorder is operated to record the EEG, EM and EMG signals on the magnetic tape at the end of each interval is assumed to be 20 seconds for the preceding interval of the monitoring period, which can be up to 8 hours, then, the total number of intervals is 48, i.e., (60÷10)×8=48, and the total length of the recording periods is 16 minutes, i.e., 20 sec. ×48 =960 sec. ÷ 60 = 16 min. In view of the foregoing, the sleep monitoring procedure which runs up to, for example, 8 hours can be recorded within the recording capacity of a commercially available cassette tape. Nevertheless, despite the foregoing, he practically available data concerning the sleep conditions of the subject can be obtained to the same extent and with the same accuracy that sleep monitoring can be carried out by the analysis of the original EEG, EM and EMG signals. However, more important is that all the components of the sleep monitoring apparatus of the present invention can be easily incorporated into a brief case since the all the components are made up of transistors and IC (integrated circuit) components.

The data analysis according to the present invention can be carrid out by listening the recorded sounds of different frequencies which correspond respectively to the orignal EEG, EM and EMG signals detected from the portions of the body of the subject. In this case, variations in the sleep pattern of the subject can be represented by variations in the number of the sounds of different frequencies preceived by the analyst.

In addition, instead of a tape recorder, a commercially available pen-recorder may be employed. However, in this case, the a decoder should be provided for reasons which will become apparent from the body of the present specification.

Figure 9:
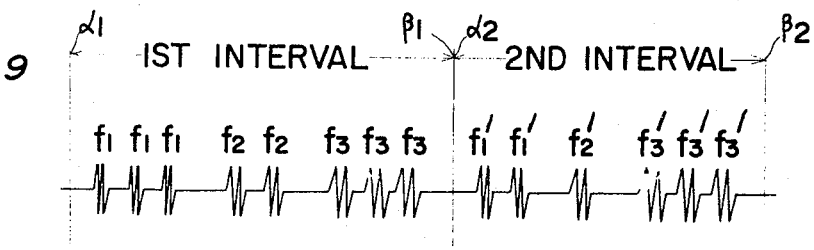
Figure 4:
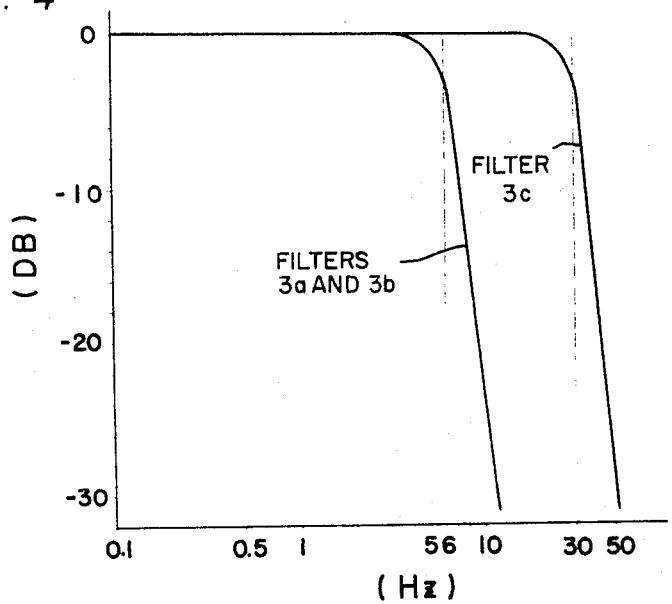
Figure 5:
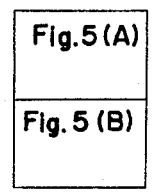
Figure 5A:
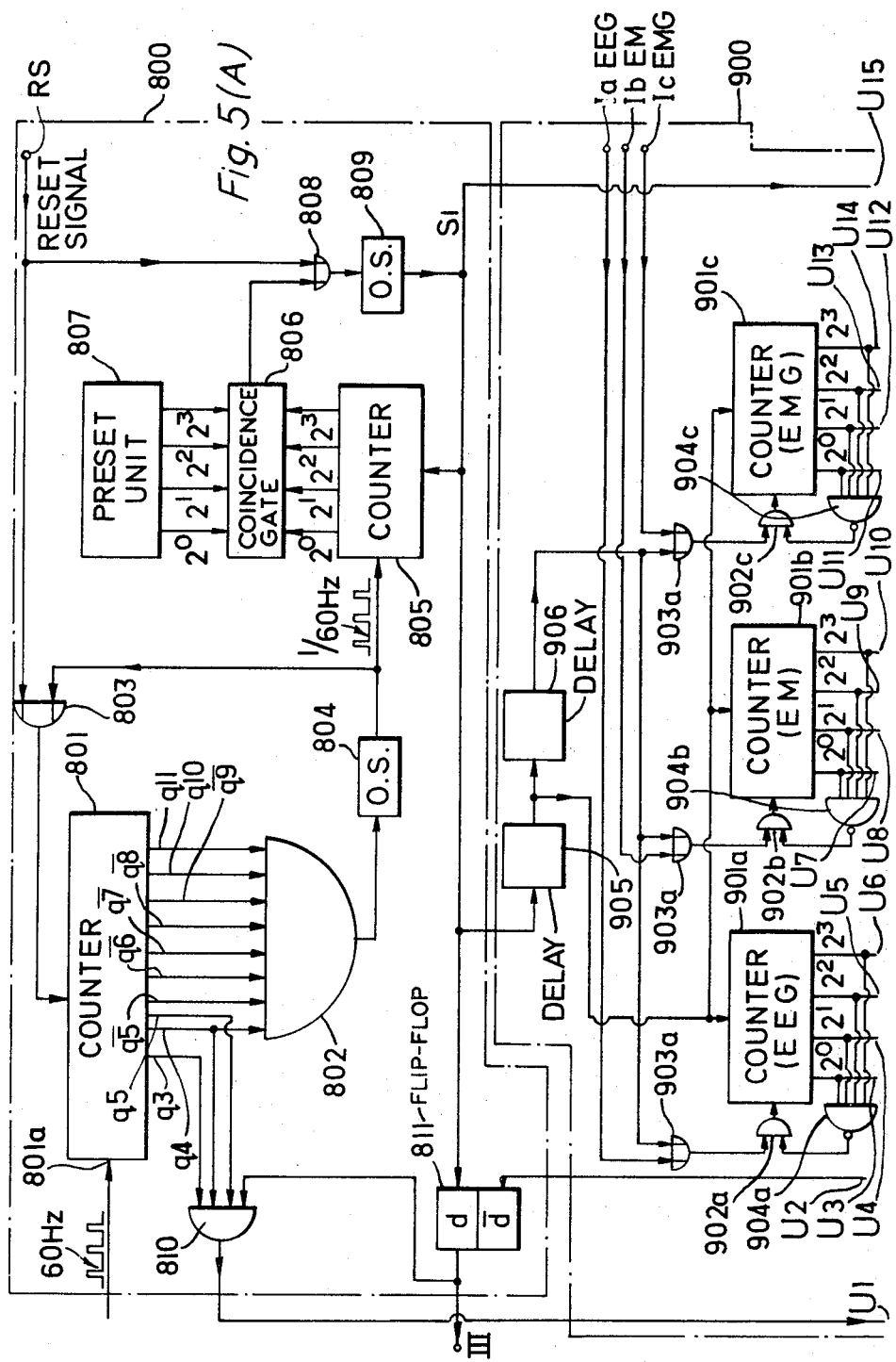
Figure 7:
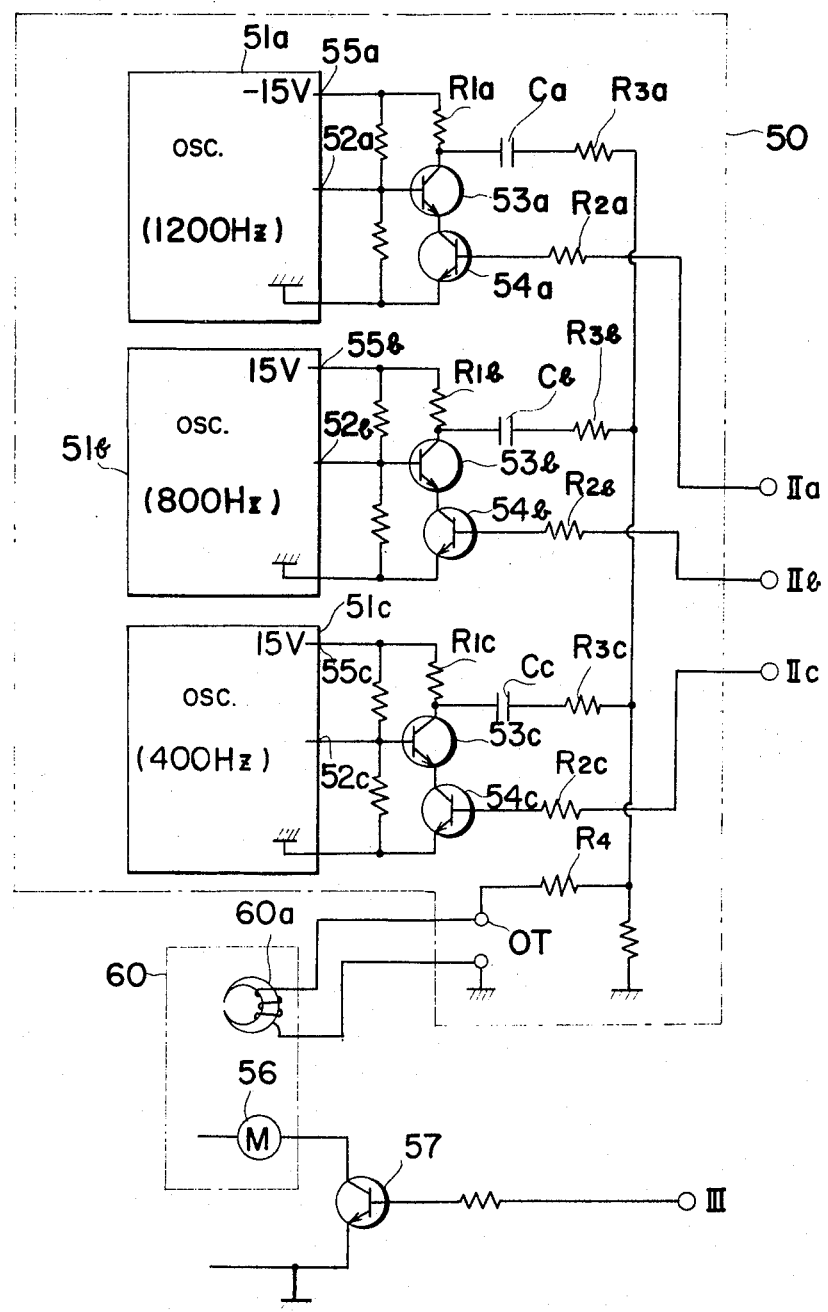
Figure 10:
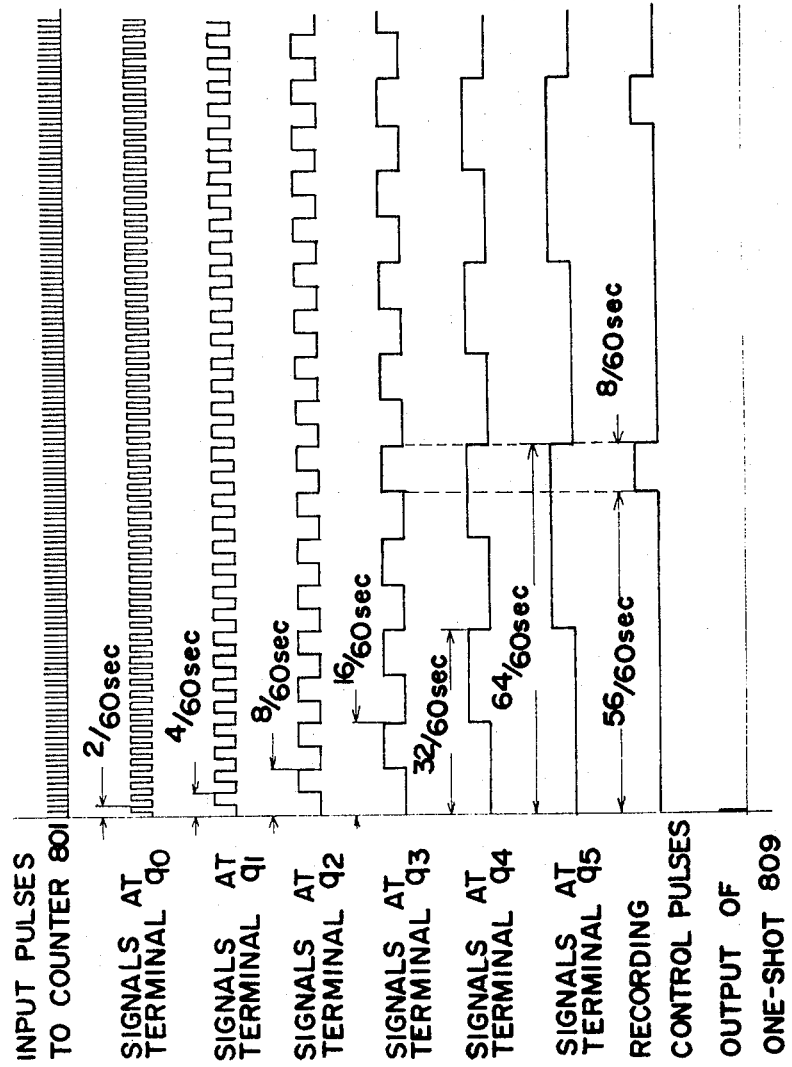
Figure 11:
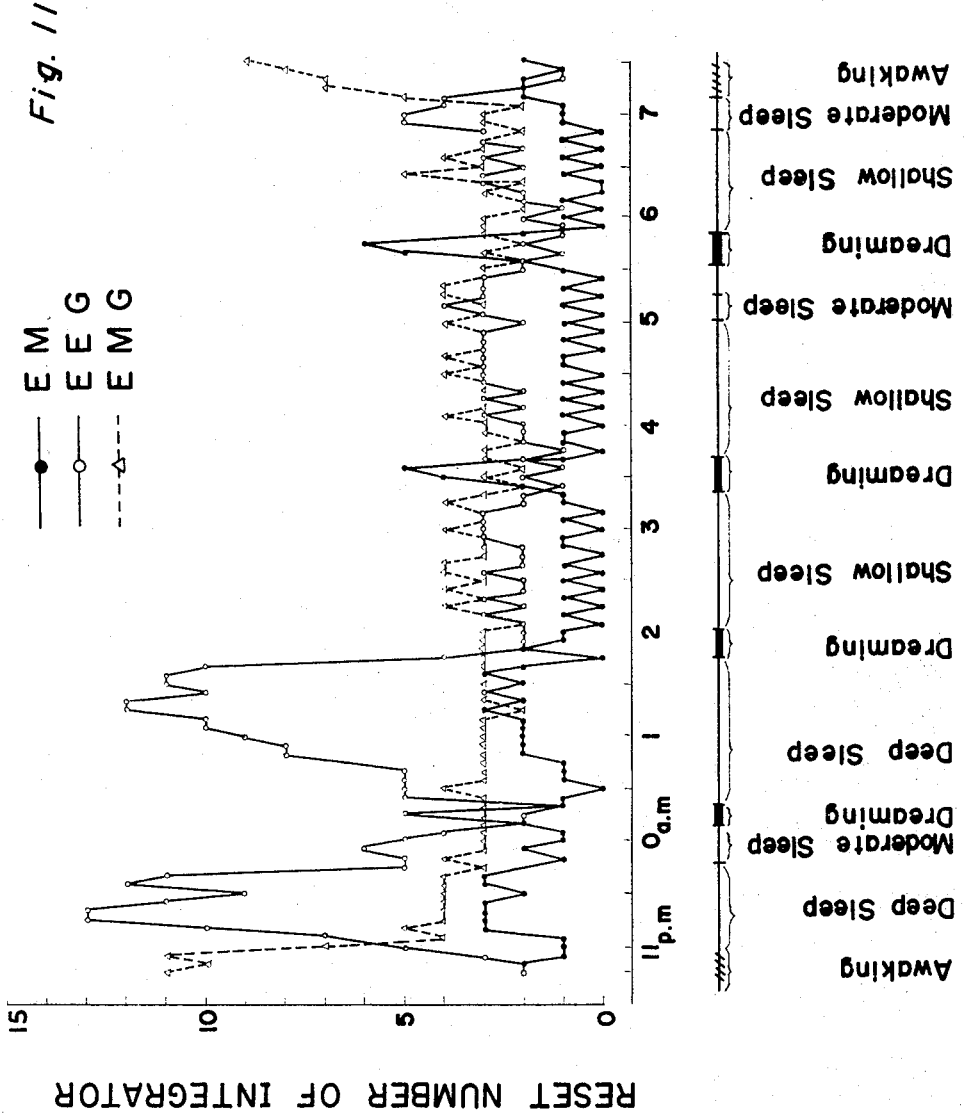

These and other objects and features of the present invention will become apparent from the following detailed description thereof taken in conjunction with a preferred form thereof with reference to the accompanying drawings, in which;

FIG. 1 is a schematic block diagram showing a sleep monitoring apparatus of the present invention, FIG. 2 is a schematic diagram showing the positioning of electrodes used to detect the electroencephalograms, the eye movements and the electromyograms of the subject to be tested, FIG. 3 is a circuir diagram of one of the EEG, EM and EMG signal conversion units of the apparatus of the present invention, FIG. 4 is a graph showing performance characteristics of three individual filters employed in the apparatus of the present invention, FIGS. 5A and 5B are circuit diagrams of parts of the data processor employed in the apparatus of the present invention, the former showing a timing signal generating circuit, FIG. 6 is a diagram of waveforms of various pulses employed for the purpose of illustrating the outputs from the data processor of the apparatus, FIG. 7 is a circuit diagram of an audio signal generating circuit employed in the apparatus of the present invention, FIG. 8 is a schematic diagram showing the relation between the monitoring period and recording periods for the purpose of illustration, FIG. 9 is a schematic diagram showing waveforms of the EEG, EM and EMG signals recorded on the magnetic tape during two consecutive recording periods, FIG. 10 is a diagram of waveforms of various pulses employed for the purpose of illustrating of the operation of the tape drive motor according to the present invention, FIG. 11 is a schematic diagram showing variations in the reset frequencies with respect to the time elapsed which correspond to the EEG, EM and EMG signals recorded on the magnetic tape according to the present invention, FIG. 2 is a schematic diagram showing the manner in which a pen recorder is used in connection with the apparatus of the present invention, FIG. 13 ia a circuit diagram of the decoder which is used only when the pen recorder is coupled with the apparatus of the present invention, and FIG. 14, parts (A) and (B) are diagrams of the EEG, EM and EMG signals recorded on the magnetic tape by the recorder and those recorded on a paper by the pen, respectfully for the purpose of illustration.

Before the description of the present invention proceeds, it is to be noted that like parts herein used are designated by like reference numerals throughout the several views of the accompanying drawings.

Referring first to FIG. 1 in which the sleep monitoring apparatus constructed in accordance with the teachings of the present invention is shown in schematic block diagram form, reference numerals 10, 20 and 30 represent individual analog-to-digital signal conversion units; the unit 10 is for the electroencephalograms or measurement of the brain waves of the subject to be tested, the unit 20 is for the eye movements of the same subject, and the unit 30 is for the electromyograms of the same subject. These signal conversion units 10, 20 and 30 are parallely disposed and connected with a common data processor 40 which is in turn connected with a recorder 60 through an audio signal generator 50. It is to be noted that, for the sake of brevity, the abreviations EEG, EM and EMG will be hereinafter used in the course of the description of the present invention and that these terms should be construed as assocaited with the electroencephalograms or brain waves, eye movments and electromyograms of the subject to be tested, respectively.

The signal conversion units 10, 20 and 30 have the substantially same construction except for differences in the performance characteristics which will be described later and respectively include first amplifiers 1a, 1b and 1c, second amplifiers 2a, 2b and 2c, filters 3a, 3b and 3c, third amplifiers 4a, 4b and 4c, rectifiers 5a, 5b and 5c, integrators 6a, 6b and 6c, level detectors 7a, 7b and 7c, and reset lines 8a, 8b and 8c individually connected between the level detectors and the integrators.

Respective sources of EEG, EM and EMG analog signals are indicated by reference characters 10a, 20a and 30a which are in turn connected with the first amplifiers 1a, 1b and 1c individually.

In view of the fact that the units 10, 20 and 30 have the same construction, a description of the structural features will be given only of one of them, namely, the EEG signal conversion unit 10, for the sake of brevity. However, reference is first made to FIG. 2 in which a method by which the EEG, EM and EMG analog signals are respectively picked up from the subject to be tested is shown.

As shown in FIG. 2, an electrode unit A consisting of a pair of electrodes $A_1$ and $A_2$ for picking up the EEG analog signal is preferably secured on the head of the subject; an electrode unit B consisting of a pair of electrodes $B_1$ and $B_2$ for picking up the EM analog signal is preferably secured on the temple portions of the subject; and an electrode unit C consisting of a pair of electrodes $C_1$ and $C_2$ for picking up the EMG analog signal is preferably secured on the chin portion of the subject. In addition thereto, a common reference electrode Ref is provided and is secured on a lower center portion of the forehead of the subject, the provision of this common reference electrode being well known to those skilled in the art which has been largely practical in connection with the electrocardiograph, the electroencephalograph, the so-called lie-detector or the like.

Referring now to FIG. 3 in which details of the circuitry of the EEG signal convertion unit 10 are shown for the purpose as hereinbefore described, the first amplifier 1a is preferably in the form of a differential amplifier comprising a pair of field effect transistors $FET_1$ and $FET_2$ and three transistors $Tr_1$, $Tr_2$ and $Tr_3$ and associated resistors and diodes connected in the configuration shown, and which has three input terminals $X_1$, $X_2$ and $X_3$, two of which are connected with the electrodes $A_1$ and $A_2$ of the electrode unit A shown in FIG. 2 and the remaining terminal $X_3$ being connected with the common reference electrode Ref, so that noise components of a commercial power source for supplying power to said differential amplifier can be eliminated. In other words, the output of this differential amplifier is in the form of a signal representative of the difference between the signals fed from the electrodes $A_1$ and $A_2$ with respect to the level of voltage detected by the reference electrode Ref.

The difference signal generated from said amplifier 1a is fed to the second amplifier 2a by which said difference signal can be amplified. The second amplifier 2a is preferably in the form of an operational amplifier constructed with a pair of first and second amplifying elements 100 and 200, such as are manufactured and sold by Philbrick/Nexus Resereach A Teledyne Company as model "SQ 10a", and four resistors and one capacitor connected substantially as shown in FIG. 3.

The filter 3a includes a suitable filtering element for eliminating noise components which may be included in a signal supplied from the operational amplifier 2a. However, the cut-off frequency characteristic differs widely, as shown in FIG. 4, amoung the filters 3a, 3b and 3c of the units 10, 20 and 30; the cut-off frequency of the filter 3a is preferably not more than 6 Hz in view of the fact that slow wave ($\delta$ wave) components of the brain waves are to be detected, the cut-off frequency of the filter 3b is preferably not more than 6 Hz, and the cut-off frequency of the filter 3c is preferably not more than 30 Hz in view of the fact that the frequency of the EMG signal is usually within a range not more than 30 Hz and concurrently for the purpose of eliminating influences brought about by the commercial power source frequency.

The output signal from the filter is adapted to be fed to the rectifier 5a through the operational amplifier 4a. However, in the amplifier 4a, the same amplifier element as that of the operational amplifier 2a may be employed. It is to be noted that in practice amplifier 4b need not be provided with the first amplifying element 100 and its associated resistors and capacitor.

The rectifier 5a includes an amplifying element 300 having the same construction as employed in the amplifiers 2a and 4a, a pair of diodes and a pair of resistors. This rectifier having the diodes $D_1$ and $D_2$ has the element connected as a precision half wave rectifier and, hence, by the operation of a combination of these diodes $D_1$ and $D_2$, the non-linearity can be decreased to a very small value. An output signal which is generated by the rectifier 5a is in turn fed to the integrator 6a.

The integrator 6a is composed of an amplifying element 400 and a capacitor $C_1$ connected across the output and input of said amplifying element 400. The amplifying element 400 is preferably a chopper stabilized amplifier, manufactured and sold by Zeltex Inc. as model "148", for eliminating a drift in the off-set voltage of the amplifying element employed in the integrator which may cause an error. The capacitor $C_1$ also has the two sides connected with a pair of relay contacts $S_1$ and $S_2$, the operation of said relay contacts $S_1$ and $S_2$ being described later. However, it is to be noted that, upon closure of these contacts $S_1$ and $S_2$, capacitor $C_1$ is discharged so that the output voltage of the integrator 6a is set to zero.

The level detector 7a essentially comprises a Schmitt trigger circuit 500, which includes four transistors $Tr_4$, $Tr_5$, $Tr_6$ and $Tr_7$ for monitoring as to whether the output from the integrator 6a exceeds a predetermined value which can be adjusted by the setting of a variable resistor VR, and a differentiation circuit 600.

The differentiation circuit 600 includes an NPN type transistor $Tr_8$ having the emitter grounded and the collector connected with a power source of, for example, 5 volts as indicated by +5V, through a resistor $R_1$ and a series circuit of a capacitor $C_2$ and a resistor $R_2$ which is connected in parallel with the resistor $R_1$. This circuit 600 further includes a resistor $R_3$ having one end grounded and the other end connected with the junction point between the resistor $R_2$ and the capacitor $C_2$. In this differentiation circuit 600, the transistor $Tr_8$ is normally triggered to the off condition and, only when a signal from the Schmitt trigger circuit 500 is supplied to the base of said transistor $Tr_8$ is it, triggered to the "on" condition thereby causing the capacitor $C_2$ to initiate its charging operation so that a differentiated pulse can be generated as an output signal from the detector 7a.

In view of the foregoing, it is clear that the output signal from the detector 7a can be generated only when the level of the output signal from the integrator 6a exceeds a predetermined value which may be varied by the adjustment of the variable resitor VR included in the level detector 7a.

The reset line 8a connected between the level detector 7a and the integrator 6a includes a one-shot circuit 700 which can be brought into an operative state upon receipt of the output signal from the level detector 7a thereby to close he contacts $S_1$ and $S_2$.

The one-shot circuit 700 includes a first NAND element $N_1$ having one input terminal connected with the output terminal of the level detector 7a, a second NAND element $N_2$ having one input terminal connected with the output terminal of the first NAND element $N_1$ and an output terminal connected with the other input terminal of said first NAND element $N_1$, a first NOT element $N_3$ having an input terminal connected with the output terminal of the second NAND element $N_2$, a second NOT element $N_4$ having an output terminal connected with the other input terminal of the second NAND element $N_2$, and a series circuit consisting of a resistor $R_4$ and a capacitor $C_3$ which is inserted between the output terminal of the first NOT element $N_3$ and ground, the input terminal of said second NOT element $N_4$ being connected with the junction point between said resistor $R_4$ and the capacitor $C_3$. The resistor $R_4$ and the capacitor $C_3$ act to determine the time during which the one-shot circuit 700 is maintained in the operative state, the value of said resistor and capacitor being preferably selected so as to maintain the one-shot circuit 700 operative for 7 milliseconds.

The reset line 8a further includes a transistor $Tr_9$ having the base connected with the output terminal of the second NAND element $N_2$ through a resistor, the emitter connected with a +5 volt power source and the collector connected with a +15 volt power source through a relay coil RC and then a resistor. The relay coil RC is operatively associated with the contacts $S_1$ and $S_2$ in such a way that, only when the relay coil RC is energized, the contacts $S_1$ and $S_2$ are engaged with each other thereby to shortcircuit the capacitor $C_1$ of the integrator 6a.

The operation of the one-shot circuit of the construction as hereinbefore described proceeds as follows; So long as no output signal is generated by the level detector 7a, the input terminal of the first NAND element $N_1$ which is connected with the output terminal of the detector 7a receives a high level signal [1], the output of said element $N_1$ being a low level signal [0]. Therefore, the output of the second NAND element $N_2$ can be maintained at a high level [1] so that the transistor $Tr_9$ is triggered to the "off" condition and, thus, the relay coil RC is maintained in the deenergized state. However, when an output signal is generated by the level detector 7a, the input terminal of said element $N_1$ connected with the output terminal of the detector 7a receives a low level signal [0], the output of said element $N_1$ then being changed to a high level signal [1]. This output [1] of said element $N_1$ is in turn applied to the corresponding input terminal of the second NAND element $N_2$ by which said high level output is changed into a low level signal [0]. Accordingly, the transistor $Tr_9$ is triggered to the "on" condition, and thus, the relay coil RC is energized whereby the contacts $S_1$ and $S_2$ are engaged with each other to shortcircuit the capacitor $C_1$ of the integrator 6a.

However, it is to be noted that, since the resistor $R_4$ and the capacitor $C_3$ are so selected as to maintain the one-shot circuit in the operative state for a predetermined time as hereinbefore described, the output of the first NOT element $N_3$ is maintained at a low level [0], even though the output of the second NAND element $N_2$ has become [0], for such predetermined time. Accordingly, during this period, the output of the second NOT element $N_4$ is maintained at a high level [1] and the output of the second NAND element $N_2$ is also be maintained at a low level [0].

Upon completion of the charge of the capacitor $C_3$, the input of the NOT element $N_4$ changed to a high level [1], the output thereof being changed to a low level signal [0]. When the input terminals of the second NAND element $N_2$ receive low level signals, the output of said element $N_2$ because a high level signal, whereby the transistor $Tr_9$ is triggered to the "off" condition.

During the closure of the contacts $S_1$ and $S_2$ which is achieved in the manner as hereinbefore described, the capacitor $C_1$ is discharged and the integrator 6a is reset each time the output of said integrator 6a attains the preset value of the level detector 7a. Accordingly, it is clear that the output from the level detector 7a is in the form of pulses having a frequency proportional to the amplitude of the original EEG signal.

On the other hand, the output signal from the level detector 7a is also fed to the data processor 40 in which the EEG signal thus fed thereto through the EEG signal conversion unit 10 can be processed in such a way as to suppress the pulse train representative of the EEG signal fed from the level detector 7a.

The description heretofore made in connection of the various components of the EEG signal conversion unit 10 is applicable to the other signal conversion units 20 and 30. However, the differences in the performance characteristics of each component among these signal conversion units 10, 20 and 30 are tabulated in Table I for a preferred form of the present invention.

TABLE I

[Characteristic differences among units 10, 20 and 30]

|  | Unit 10 | | Unit 20 | | Unit 30 | |
| --- | --- | --- | --- | --- | --- | --- |
|  | Gain[1] | Time constant[2] | Gain[1] | Time constant[2] | Gain[1] | Time constant[2] |
| Differential amplifier | 20 | 1 | 20 | 0.05 | 20 | 0.1 |
| First stage of first amplifier | 5 | ∞ | 5 | ∞ | 5 | ∞ |
| Second stage of first amplifier | 100 | 1 | 50 | 0.05 | 100 | 0.1 |
| First stage of second amplifier | 17 | 1 | (Not provided) | | 33 | 0.1 |
| Second stage of second amplifier | 1 | 1 | 2 | 0.50 | 1 | 0.1 |
| Integrator | / | 5 | / | 1 | / | 5 |

[1] In multiple.
[2] In seconds.

TABLE II

[Characteristic difference among filters 3a, 3b and 3c]

|  | Filter 3a | Filter 3b | Filter 3c |
| --- | --- | --- | --- |
| Cut-off frequency (Hz) | 6 | 6 | 30 |

Although the EEG, EM and EMG signals are simultaneously fed from the respective signal conversion units 10, 20 and 30 to the data processor 40 through individual parallel channels, the data processor 40 also acts to convert these signals into one channel in a serially spaced relation with respect to one another.

Hereinafter, a description will be given of the data processor 40 with reference to FIG. 5(A) and FIG. 5(B).

The data processor 40 essentially comprises a timing signal generating circuit 800 capable of generating various pulses which are used to control the operation of the recorder 60 and concurrently used to divide into a pluarlity of consecutive intervals the whole period in which the sleep monitoring is performed, and a signal recording control circuit 900 capable of controlling various circuit elements of the data processor to convert the signals simultaneously fed from the corresponding signal conversion units 10, 20 and 30 into a series of pulses under the instruction given by the pulses generated from the timing signal generating circuit 800.

In the timing signal generating 800, reference numeral 801 denotes a first binary counter consisting of twelve stages of cascade-connected flip-flops (not shown), having a pluarlity of output terminals $q3$, $q4$, $q5$, $\overline{q5}$, $\overline{q6}$, $\overline{q7}$, $\overline{q8}$, $\overline{q9}$ $q10$ and $q11$ wherein $\overline{q5}$, $\overline{q6}$, $\overline{q7}$, $\overline{q8}$ and $\overline{q9}$ are output terminals generating inverted output from $q5$, $q6$, $q7$, $q8$ and $q9$, respectively.

This binary counter 801 is adapted to receive at an input terminal 801a a pulse train having a frequency of 60 Hz, so that said counter generates outputs at one or more of the output terminals $q3$ through $q11$ which respectively represent $2^3$ through $2^{11}$ position of binary digit, in response to the number of the input pulses. This pulse train can be obtained by shaping the waveform of a commerical electric power source of 60 Hz into rectangular pulses.

The output terminals $q4$ through $q11$ except for $q5$ are connected to input terminals of an AND gate 802, respectively, and the output terminal of said gate 802 is in turn connected to one input terminal of an OR gate 803 and a counter 805 through a first one-shot circuit 804. The output terminal of said OR gate 803 is connected to a reset terminal of the counter 801.

In this arrangement, the output signals from the one-shot circuit 804 produce pulses of 1/60 Hz, namely, a train of pulses at intervals of 60 seconds, since the AND gate 802 produces an output when said first counter 801 counts up to 3,600 input pulses, through the output terminals $q4$, $q9$, $q10$ and $q11$ which correspond to the number $2^4 + 2^9 + 2^{10} + 2^{11} = 3,600$.

The output of the first AND gate 802 is applied to the reset input terminal of the first counter 801 through the first one-shot circuit 804 and the OR gate 803 so that said first counter 801 is reset automatically. The output terminal of the first one-shot circuit 804 is also connected with an input terminal of a second binary counter 805 consisting of four cascade-connected flip-flops (not shown) and having four binary output terminals corresponding to $2^0$, $2^1$, $2^2$ and $2^3$ positions. Output terminals of the second binary counter 805 are in turn connected to the input terminals of a first digital coincidence gate 806 the other input terminals of which are connected with four binary output terminals of a preset unit 807 which generates binary outputs from any one of four output terminals according to the number set by the preset dial (not shown) manually operable by the operator to determinate the value of each interval.

The output terminal of said digital coincidence gate 806 is connected with the reset terminal of said second binary counter 805 through a second OR gate 808 and a second one-shot circuit 809. This first digital coincidence gate 806 generates an output when the number preselected by the preset unit 807 coincides with the number of pulses counted by the second binary counter 805, and this output from the coincidence gate 806 resets the second binary counter 805 so that the above operation can be repeated. In addition, the one or more output terminals at which an output signal or signals of the second counter 805 appear may change at intervals of 60 seconds in response to the pulses applied from the first one-shot circuit 804.

Accordingly, the period of each output signal obtainable from the second one-shot circuit 809 can be set to be from 1 minute to 10 minutes in response to the setting of the preset dial.

The binary outputs $q3$, $q4$ and $q5$ of the first binary counter are also onnected with three input terminals of a second AND gate 810 the fourth input terminal of which is connected with an output terminal of a flip-flop 811 which is adapted to be set by the output signal from the second one-shot circuit 809, so that said AND gate 810 can generates a train of pulses each having a pulse width of 8/60 seconds and the pulse interval of 64/60 seconds. This pulse train from the AND gate 810 is utilized as a standard signal for recording signals of audible frequency which are representative of variations in the electroencephalogram, the eye movements and the electromyograms, respectively, and, therefore, this pulse train will be hereinafter referred to as the recording control signal.

In the signal recording control circuit 900, there are provided three binary counters 900a, 901b and 901c for counting the number of pulses fed respectively from the signal conversion units 10, 20 and 30, and each having four cascade-connected flip-flops and four binary output terminals corresponding to $2^0$, $2^1$, $2^2$ and $2^3$ positions. The respective input terminals of counters 901a, 901b and 901c are connected with respective input terminals Ia, Ib and Ic, through respective AND gates 902a, 902b and 902c and respective OR gates 902a, 903b and 903c, to receive the respective signals from the signal conversion units 10, 20 and 30.

The AND gates 902a, 902b and 902c also receive the signals generated from NAND gates 904a, 904b and 904c the input terminals of which are connected with binary output terminals of said counters 901a, 901b and 901c, respectively. Each OR gate 903a, 903b and 903c receives the signal generated from the one-shot circuit 809 through delay circuits 905 and 906. Each reset terminal of the counters 901a 901b and 901c is connected with the output terminal of the delay circuit 905.

In this arrangement the counters 901a, 901b and 901c count the number of pulses of EEG, EM and EMG signals, respectively, and are reset by the reset signals respectively fed from the delay circuit 905.

Reference numerals 907a, 907b and 907c denote buffer registers which store the output signals generated from the corresponding counters 901a, 901b and 901c. Each of the four outputs of these registers is connected with an input terminal of corresponding first through fourth AND gate elements of AND circuit groups 908a, 908b and 908c.

Each output terminal of said first through fourth AND gate elements of each group is connected with a correspnding $2^0$, $2^1$, $2^2$ and $2^3$ input terminals of a coincidence gate 909 through first through fourth OR gates 910, 911, 912 and 913. The other $2^0$, $2^1$, $2^2$ and $2^3$ input terminals of said coincidence gate 909 are connected with corresponding output terminals of a counter 914 the input terminal of which is connected with the output terminal of the AND gate 810 which supplies the recording control signal thereto.

The coincidence gate 909 generates outputs when the value of the outputs of the counter 914 which counts the number of pulses of the recording control signal coincides with the value of the outputs of the OR gate 910 through 913 which represents the number counted by the counters 901a, 901b and 901c.

The output terminal of the coincidence gate 909 is connected with an input terminal of a one-shot circuit 915 the output terminal of which is connected with one of the input terminals of an AND gate 916, a reset terminal of a first flip-flop 917, and a reset terminal of a second flip-flop 918 through a delay circuit 919. Set signal input terminals of each flip-flop 917, 918 and 920 are connected with the output terminal of one-shot circuit 809. The reset output terminal of the first flip-flop 917 is connected with one input terminal of an AND gate 921 the other input terminal of which is connected with the set terminal of the third flip-flop 920. The other input terminal of the AND gate 916 is connected with the reset output terminal of the second flip-flop 918 and the output of AND gate 916 is connected with the reset input terminal of the third flip-flop 920.

The set output of the first flip-flop 917 is connected with the outer input terminal of each of the first through fourth AND gate elements of the first AND gate group 908a, and an input terminal of an AND gate 922. The output terminal of the AND gate 921 is connected with each of the other input terminals of the first through fourth AND gate elements of the second AND gate group 908b, and one input terminal of an AND gate 923. The reset output terminal of the third flip-flop 920 is connected with the other input terminal of each of the first through fourth AND gate elements of the third AND gate group 908c and one input terminal of an AND gate 924.

Another input terminal of each of these AND gates 922, 923 and 924 is connected with the output terminal of the coincidence gate 909 through a NOT circuit 925, and the third input terminals of said three AND gates 922, 923 and 924 are connected with the output terminal of the AND gate 810.

Reference numeral 926 denotes an AND gate having one input terminal connected with the output terminal of the coincidence gate 909 and the other input terminal connected with the reset output terminal of the third flip-flop 920, the output terminal of which is connected with the reset input terminal of the flip-flop 811. Reference numeral 927 is an OR gate having one input terminal connected with the output terminal of the one-shot circuit 915 and the other input terminal connected with the one-shot circuit 809, the output terminal of which is connected with the reset input terminal of the counter 914.

It is to be noted that the elements as indicated by reference numerals 916, 917, 918, 919, 920 and 921 constitute a gate control signal generator unit.

The operation of the signal recording control circuit 900 will be hereinafter described. The EEG, EM and EMG signals are respectively applied from the corresponding signal conversion units 10, 20 and 30 to the inut terminals Ia, Ib and Ic, which are in turn fed to the counters 901a, 901b and 901c through the OR gates 903a, 903b and 903c. In view of the fact that each of the EEG, EM and EMG signals is in the form of a train of pulses of the substantially equal in number to the reset frequencies of integrators 6a, 6b and 6c, the number of pulses of these EEG, EM and EMG signals is respectively counted by the corresponding counters 901a, 901b and 901c. Each of the contents of these counters 901a, 901b and 901c which represent the counted number of the pulses of these signals, respectively, is fed to the corresponding buffer register 907a, 907b or 907c during the duration of the output signal which is applied from the one-shot circuit 809 to each of these buffer registers. At the same time, the gate control signal generator unit generates, as will be described later, a gate control signal $G_1$ through its flip-flop 917 which is in turn fed to the AND gate elements of the AND gate group 908a so that only the content of the buffer register 907a can be transferred to the digital coincidence gate 909 through the AND gate group 908a and then the OR gates 910 through 913. The content thus transferred to the digital coincidence gate 909 and which is associated with the EEG signal is then registered with binary signals fed from the counte 914 to which the recording control signal has been applied as hereinbefore described. However, during a period beginning from the generation of the output signal from the one-shot circuit 809 and ending with the generation of the output signal from the coincidence gate 909 which is achieved upon coincidence of the content of the buffer register 907a with the content of the counter 914, a certain number of pulses of the recording control signal can be passed through the AND gate 922 in response to the content of the buffer register 907a.

It is to be noted that the AND gate 922 is adapted to receive the signal $G_1$ and the output signal from the coincidence gate 909 which has been inverted by the NOT circuit 925, other than the recording control signal, Therefore, the AND gate 922 acts to permit the passage of the recording control signal herethrough during the period beginning from the generation of the output signal from the one-shot circuit 809 to the generation of the output signal from the digital coincidence gate 909.

The output signal from the coincidence gate 909 is on the other hand applied to the gate control signal generator unit through the one-shot circuit 915 causing the gate control signal generator unit to generate a gate control signal $G_2$ which is used in a similar way as the above mentioned gate control signal $G_1$ to permit, at its ultimate end, the passage of the recording control signal through the AND gate 923 in association with the EM signal. Similarly, upon generation of a gate control signal $G_3$ from the gate control signal generator, the recording control signal can be passed through the AND gate 924 in associated with the EMG signal. Thus, each cycle of the above mentioned operation can be repeated in response to the generation of the output signal from the one-shot circuit 809.

Attention is now directed to the operation of the gate control signal generator unit. In this gate control signal generator unit, so long as no output signal is generated from the one-shot circuit 809, the stages $a$, $b$ and $c$ of the flip-flops 917, 920, and 918 are respectively in condition to generate low level outputs while the stages $\overline{a}$, $\overline{b}$ and $\overline{c}$ thereof are in position to generate high level outputs. However, upon generation of the output signal from the one-shot circuit 809, the stages $a$, $b$ and $c$ of the flip-flops 917, 920 and 918 are respectively brought into condition to generate high level outputs. Therefore, it is clear that, upon generation of the high level output from the stage $a$ of the flip-flop 917, the gate control signal $G_1$ can be generated while the outputs from the stages b and c of the flip-flops 920 and 918 are respectively restricted by the AND gates 921 and 916.

Subsequently, when the output signal from the one-shot circuit 915 is generated in response to the output signal from the coincidence gate 909, this output signal from the one-shot circuit 915 causes the stage $\bar{a}$ of the flip-flop 917 to generate a high level output and to diminish the gate control signal $G_1$ whereby the AND gate 921 can be triggered to the "on" condition upon receipt of the output from the stage $\bar{a}$ of the flip-flop 920 to generate the gate control signal $G_2$. On the other hand, the output signal from the one-shot circuit 915 is at the same time applied to the stage $\bar{c}$ of the flip-flop 918 through the delay circuit 919. However, in view of the fact that the delay circuit 919 acts to delay the application of the output signal from the one-shot circuit 915 to the flip-flop 918, the output signal from the one-shot circuit 915 diminishes at the time the output from the stage $\bar{c}$ of the flip-flop 918 has become a high level signal and, therefore, the AND gate 916 cannot be triggered to the "on" condition. However, upon the following generation of the output signal from the digital coincidence gate 909, the one-shot circuit 915 generates an output signal, the AND gate 916 can be triggered to the "on" condition upon receipt of the output signal from the one-shot circuit 915 and the output from the stage $\bar{c}$ of the flip-flop 918 thereby to generates a signal to the stage $\bar{b}$ of the flip-flop 920 so that the output from the stage $\bar{b}$ thereof can become a high level signal. Thus, the gate control signal $G_3$ can be generated and with this gate control signal $G_3$ a cycle of the operation of the data processor is completed. However, each time the cycle of operation as hereinbefore described is completes, the flip-flop 917, 920 and 918 are restored to their original states, respectively, unless otherwise a subsequent generation of an output signal from the one-shot circuit 809 takes place.

In the foregoing description, it is clear that the AND gate 922, 923 and 924 are triggered on the succession so that a series of spaced trains of audible frequency signals representative of the EEG, EM and EMG signals can be, as will be described later, obtained from the audio signal generator 50. However, the reason that the spaced relation can be obtained in the series of the audible signal trains will be hereinafter clearly described with reference to FIG. 6.

Referring now to FIG. 6 in which various pulse waveforms for the circuit components of the data processor 40 are shown, when the pulses correponding in number to the pulses of the EEG signal have been applied to the binary counter 914, the gate 909 generates a high level output [1] and, thus, the output of the NOT gate 925 becomes [0]. On the other hand, the output from the one-shot circuit 915 can be fed to the counter 914 through the OR gate 927 to reset said counter 914. In view of the fact that the output of the counter 914 is generated at the end of the duration of each of pulses the of the recording control signal, the output of the coincidence gate 909 becomes [0] at the end of the duration of the pulse $P_1$ of the recording control signal substantially as shown.

Therefore, the output of the NOT gate 925 becomes [1] and, on the other hand, when the AND gate 923 receives, in addition to the output of the NOT gate 925, the next succeeding pulse or pulses of the recording control signal and the gate control signal $G_2$, a train of pulses representative of the EM signal can be obtained from the AND gate 923. The same applies to the time lag between the generation of the train of pulses representative of the EM signal and that of the pulse train representative of the EMG signal.

Referring now to FIG. 7, an audible signal generating circuit 50 is shown. The audible signal generating circuit 50 shown includes audio frequency oscillators 51a, 51b and 51c of any suitable construction and having respective output terminals 52a, 52b and 52c from which signals having different frequencies, for example, of 1,200 Hz, 800 Hz and 400 Hz, all within the audible range, can be continuously generated.

Each of these audio frequency oscillators 51a, 51b and 51c includes a switching device operable by the input pulses fed from the data processor, as will be described later, thereby permitting the supply therethrough of an audible signal which is in turn recorded by the recorder 60. These switching devices all have the same construction and, therefore, only one of the switching devices which is associated with the 1,200 Hz audio frequency oscillator 51a will be hereinafter described.

The switching device associated with the oscillator 51a includes two series connected transistors 53a and 54a provided at an output of the oscillator 51a. The base of the transistor 53a is connected with the output terminal 52a of the oscillator 51a, the collector thereof is connected with a DC output terminal of the oscillator 51a through a resistor R1a and the emitter thereof is connected with the collector of the other transistor 54a. The emitter of the transistor 54a is grounded while the base thereof is connected with the output terminal of the AND gate 922 of the data processor 40 through a terminal IIa through a resistor R2a. The collector of the transistor 53a is also connected with one end of a series circuit consisting of a coupling capacitor Ca and a resistor R3a, the other end of this series circuit being connected with the ground through a resistor and through a resistor $R_4$ with an output terminal OT connected to the input terminal of the recorder 60.

With the switching device having the above arrangement, it is to be noted that the transistors 54b and 54c of the switching devices associated with the oscillators 51b and 51c are respectively connected through their bases with the AND gates 923 and 924 through corresponding terminals 11b and 11c.

In the above arrangement, when the EEG, EM and EMG pulses are applied in succession to the transistors 54a, 54b and 54c through the terminals IIa, IIb and IIc causing the latter to be triggered to the "on" condition, the audible signals from the oscillators 51a, 51b and 51c can be amplified at the respective times by the transistors 53a, 53b and 53c and are in turn fed to the input terminal of the recorder 60 through one channel in a spaced relation with resepct to one another.

According to the present invention, the recorder 60 is in the form of a commercially available magnetic tape recorder, preferably, a cassette tape recorder. As is well known to those skilled in the art, the commercially available tape recorder 60 generally includes a magnetic transducer head 60a having a coil and a tape drive motor 56 inserted between a suitable power source (not shown) and the ground. This commercially available tape recorder is somewhat modified to suit to the present Invention in that the motor circuit has a switching transistor 57 incorporated therein having the base connected with a terminal III through a suitable resistor, the emitter connected with the ground and the collector thereof connected with the motor 56. This is because, as will be clearly understood from the following description, the tape drive motor 56 should be intermittently driven so that each series of the EEG EM and EMG signals within the audible range generated from the audio signal generating circuit 50, as shown in FIG. 9, in response to the respective pulses fed from the data processor 40 at the end of each interval of the monitoring period can be recorded on a magnetic tape.

In addition, the magnetic transducer head is connected with the audio signal generating circuit in such a way that one end of the head coil is connected with the terminal OT in FIG. 7. This connection can be easily achieved by inserting a connection jack (not shown), which is connected with the terminal OT of the audio signal generating circuit, into a microphone input terminal of the commercially available tape recorder.

The manner in which the EEG, EM and EMG signals are recorded by the recorder 60 will be hereinafter described with reference to FIG. 7 in combination with FIGS. 5 (A) and (B). However, in brief, it is to be noted that the tape drive motor 56 is adapted to be operated at the time the output signal is generated from the one-shot circuit 809 and cease its operation at the time the EEG, EM and EMG signals of audible frequencies during each interval have been recorded by the recorder 60. This mode of operation of the tape drive motor 56 is carried out in response to the voltage appearing at the terminal III. This voltage necessary to operate the tape drive motor 56 can be obtained when the output signal from the one-shot circuit 809 has been applied to the flip-flop 811 causing the stage d of said flip-flop to generate a high level output. On the other hand, the voltage will disappear when the flip-flop 811 is triggered to the "off" condition which is achieved by the output signal from the AND gate 926 upon receipt of the gate control signal $G_3$ and the output signal from the coincidence gate 909. It is to be noted that the set output of the flip-flop 811 is also impressed on the AND gate 810 whereby the generation of the recording control signal from the gate 810 can be advantageously inhibited, so that the EEG, EM and EMG pulses through the respective AND gates 922, 923 and 924 will not appear during a period in which the tape drive motor 56 is in the inoperative condition. However, in view of the fact that the first of the EEG, EM and EMG pulses emerges from the data processor 40 delayed 56/60 seconds with respect to the generation of the output signal from the one-shot circuit 809, the tape drive motor 56 can reach a constant speed and, therefore, no recording error will occur during the motor start period. More specifically, as shown in FIG. 10 in which waveforms of pulses generated from the output terminals $q0, q1, q2, q3, q4$ and $q5$ (of which, $q0, q1$ and $q2$ are not shown) of the counter 801, the recording control signal and the output signal from the one-shot circuit 809 are respectively shown, it is clear that the AND gate 810 is adapted to receive a pulse having the cycle of 16/60 second and a width of 8/60 seconds, a pulse having a cycle of 32/60 second and the width of 16/60 second, and the pulse having a cycle of 64/60 second and a width of 32/60 second, from the output terminals $q3, q4$ and $q5$ of the counter 801, respectively. While in the above condition, when the output signal is applied to the AND gate 810 from the flip-flop 811, the AND gate 810 will generate a recording control signal in the form of a pulse having a cycle of 64/60 second and a width of 8/60 second as indicated in FIG. 10.

On the other hand, since the counter 805 is such that the operational step thereof varies at the end of the duration of each pulse applied thereto, the output signal from the coincidence gate 806 and, hence, the output signal from the one-shot circuit 809 is generated at the end of the duration of the pulse applied to the counter 805. Therefore, at the time the output signal from the one-shot circuit 809 is generated, i.e., at the time the tape drive motor 56 is operated, no recording control signal is generated, but is only generated 56/60 second after the output signal has been generated from the one-shot circuit 809, i.e., the tape drive motor 56 has been operated.

Attention is now directed to the construction of the data processor 40 wherein the NAND gates 904a, 904b and 904c are provided for a reason which will be described later. Each of the binary counters 901a, 901b and 901c capable of counting up to 15 pulses is usually constructed so as to reset at the sixteenth pulse. According to the present invention, a possible inconvenience will arise when the counted value of the pulses exceeds fifteen and, accordingly, to eliminate this possible inconvenience, the NAND gates 904a, 904b and 904c have been provided to generate output signals when the counted values of the counters 901a, 901b and 901c respectively attain the value of 15, said output signals from the corresponding gates 904a, 904b and 904c being in turn applied through the AND gates 902a, 902b and 902c to the counters 901a, 901b and 901c respectively, thereby to inhibit the entry of the EEG, EM and EMG signals from the terminals Ia, Ib and I c into these counters 901a, 901b and 901c. Despite the above arrangement, the employment of a counter capable of counting 15 pulses for the counters 901a, 901b and 901c does not bring about any inconvenience since the reset frequencies as shown in FIG. 9 were, according to the experiment conducted in connection with the present invention, found not to exceed 15. Even if the reset frequencies exceed 15, the data analysis will not be hampered.

As hereinbefore described, the counters 901a, 901b and 901c are adapted to be reset by the output signal from the one-shot circuit 809 immediately after the content of each of these counters has been transferred to the corresponding buffer register 907a, 907b and 907c. However, these counters 901a, 901b and 901c can be again set by the output signal from the delay circuit 905 after the contents thereof have been transferred to the buffer registers, said output signal from the delay circuit 905 being generated in a delayed relation with respect to the output signal from the one-shot circuit 809 so that one additional pulse can be added to the counted value of each of the counters 901a, 901b and 901c. This is because, in the case where no resetting of the integrator takes place during an interval of the monitoring period, i.e., in where one or all of the EEG, EM and EMG signals have a relatively lower level such as observed during a period in which the subject to be tested is in the condition of shallow sleep as shown in FIG. 11, no signal is recorded on the magnetic tape which makes it difficult to identify the boundary between one interval and another of the monitoring period. In view of the fact that an arrangement has been made to add one additional pulse to the counted value of each of the counters 901a, 901b and 901c, this additional pulse should be cancelled or neglected during the data analysis of the record made by the tape recorder or a suitable pen recorder as will be decribed later.

In the following, the manner in which the sleep monitoring apparatus of the present invention is used will be described, particularly with reference to FIG. 11 in which variations in the reset frequencies of the integrators 6a, 6b and 6c are respectively shown with respect to the time elapsed during the monitoring period. In the graph as shown, the abscissa is the time while the axis of ordinate is the reset frequency and the analytical results obtained by the analysis of the tape recorded sounds representative of the EEG, EM and EMG signals, respectively, are shown below the axis of abscissa. Before the description proceeds, a reliable criterion on which the analytical results are based will be illustrated as tabulated in Table III.

The graph of FIG. 1 was obtained by an experiment conducted with the use of the sleep monitoring apparatus of the present invention on a normal healthy person. The graph indicates variations in the sleep condition of the subject tested during a period from 23:00 to 07:00, that is, during the subject's sleeping hours. With reference to the graph, at 1 o'clock a.m. the value of the EEG signal recorded is observed to have a relatively great value with respect to the time elapsed, the value of the EM signal recorded is relatively average with respect to the time elapsed and the value of the EMG signal recorded has a relatively small value with respect to the time elapsed. About at 5:40 a.m., the values of the EEG, EM and EMG signals are observed to have relatively small, great and small values, respectively.

Now turning to the Table III, it will be clearly understood that the subject tested was in the deep sleep and dreaming conditions about at 1 o'clock and 5:40 o'clock in the early morning, respectively.

According to the present invention, instead of the tape recorder, a pen recorder unit may be employed. In this case, the pen recorder may be directly connected with the data processor 40. However, the use of the pen recorder requires a person to watch the operation of the pen recorder all during the subjects's sleeping time for the reason as hereinbefore described and, therefore, the employment of the pen recorder directly coupled with the data processor 40 is inconvenient.

In the event that a record on paper of the data for later analysis of the sleep condition of the subject is necessary, a decoder having a construction as shown in FIG. 13 is preferably employed and is connected between the recorder 60 and the pen recorder as shown in FIG. 12.

Referring now to FIG. 13 in which a detailed circuit of the decoder of FIG. 12 is shown, a pair of transistors $Q_1$ and $Q_2$ constitute an emitter-follower, the output of the transistor $Q_2$ being adapted to be rectified by a diode D and smoothed by a capacitor C. In this circuit, by suitably selecting the values of the capacitor C and a resistor R disposed in parallel to said capacitor C to provide a suitable time constant, the output voltage of the decoder can be made depend on the frequency of the input within the audible frequency range. If this decoder is employed between the recorder 60 and the pen recorder in the manner as hereinbefore described, the input signal, i.e., a series of discrete signals corresponding to the EEG, EM and EMG signals, can be converted into a series of pulses having different amplitudes such as shown in FIG. 14, part (B), the input signal to the decoder, which is identical with the output of the audio signal generator 50 recorded on the tape of the recorder 60, being shown in FIG. 14, part (A). Accordingly, the data analysis can be easily performed from the record on the paper obtained by the employment of the decoder or the above construction.

Although the present invention has been fully described, care must be taken that, when the apparatus of the present invention is operated, a reset pulse is first applied through the OR gates 803 and 808 by means of a terminal RS (FIG. 5(A)) to reset the counters 801 and 805, respectively, so that said counters 801 and 805 are cleared. In this case, the terminal RS is preferably connected with a suitable reset signal generator (not shown) which is manually operated.

Furthermore, each of the electrode units A, B and C may be employed in the form of a commercially available silver electrode heretofore largely employed in association with the electroencephalograph, the electrocardiograph, the so-called lie-detectpr or the like.

According to the present invention, the apparatus herein proposed is designed such that signals representing of variations in the electroencephalograms, the eye movements and the electromyograms of the subject to be tested are respectively recorded on commercially available magnetic tape in the form of the reset frequencies of the integrators 6a, 6b and 6c respectively associated with the EEG, EM and EMG signals and counted during each interval of the monitoring period. Accordingly, as compared with the conventional device of this kind in which the data recording is continuously performed which results in the formation of a paper record of some hundred meters and concurrently necessitating a person to watch the operation of the device, the sleep monitoring apparatus of the present invention affords reduction of the length of the recording medium necessary to the monitoring labor and redundancy of the data analysis.

Although the present invention has been fully described by way of example in connection with the preferred form of the sleep monitoring apparatus with reference to the accompanying drawings, it is to be noted that various changes and modifications will be apparent to those skilled in the art, such changes and modifications being construed as included within the scope of the present invention unless otherwise departing therefrom. In addition, the same may apply to the method herein proposed in accordance with the teachings of the present invention.

TABLE III

| | Sleeping Conditions | | | |
|---|---|---|---|---|
| | Awaking | Deep Sleep | Shallow Sleep | Dreaming |
| E E G:* | Small | Great | Small | Small |
| E M:** | Small | Average+ | Small | Great |
| E M G:*** | Great | Small | Small | Small |

[NOTE I]
*: Relative value of the reset frequencies or of discrete sounds of 1,200 Hz.
**: Relative value of the reset frequencies or of discrete sounds of 800 Hz.
***: Relative value of the reset frequencies or of discrete sounds of 400 Hz.
[Note II]
As hereinbefore described, the reset frequency of each of the integrators 6a, 6b and 6c is in proportional relation with respect to the value of discrete sounds recorded on the corresponding one of the EEG, EM and EMG signals.
[NOTE III]
The validity of this criterion is supported by the following bibliographies;

Dement, W. & Kleitman, N.: "Cyclic variation in EEG during sleep and their relation to eye movements, body motility, and dreaming", EEG Clin. Neurophysical. 2, 673-690, 1957.

Jouvet, M.: "Neurophysiology of the States of Sleep", Pysiological Review 47, 117-177, 1969.

[NOTE IV]

+: The value of the discrete sounds of 800 Hz must be essentially small. However, this should be construed as "average" in view of the fact that, since the distance between the electrode units A and B is so close, the electrode unit B is somewhat affected by the electroencephalograms to be detected by the electrode unit A.

What is claimed is:

1. A method for monitoring the behaviour during sleep which comprises steps of detecting analog signals representative of electroencephalograms, movements of the eyes and electromyograms, respectively, by means of a plurality of electrodes detachably secured on portion of the body of a living organism, converting said analog signals into digital signals, each of said digital signals having a digital value substantially corresponding to the amplitude of the corresponding one of said analog signals, dividing the whole monitoring period into a plurality of intervals and concurrently measuring said digital value of each of said digital signals appearing during each of said intervals, recording the results given during said measurement, and reproducing said recorded results whenever desired.

2. A method for monitoring the behaviour during sleep which comprises steps of detecting analog signals representative of electroencephalograms, movements of the eyes and electromyograms, respectively, by means of a plurality of electrodes detachably secured on portions of the body of a living organism, rectifying said analog signals fed from said electrodes, integrating DC components of signals that have been respectively integrated, detecting whether the signals that have been respectively integrated exceed over predetermined values, applying signals when said integrated signals exceed said predetermined values, resetting in response to the signals that have been respectively detected, dividing the whole monitoring period into a plurality of intervals and concurrently counting the digital amount of each of said digital signals appearing during each of said intervals, storing at the end of each interval the digital amount of the corresponding one of said digital signals that has been counted, generating individual trains of pulses respectively corresponding to the contents that have been stored, transferring said individual trains of the pulses into a single channel carrying therein said trains of pulses in a serially spaced relation with respect to each other, recording said trains of the pulses carried in said single channel, and reproducing said recorded trains of the pulses whenever desired.

3. An apparatus for monitoring behavior during sleep which comprises a plurality of electrodes adapted to be detachably secured on portions of the body of a living organism for detecting analog signals representative of electroencephalograms, movements of the eyes and electromyograms, respectively, converting means connected to said electrodes for converting said analog signals into digital signals, each of said digital signals having a digital value substantially corresponding to the amplitude of the corresponding one of said analog signals, dividing means for dividing the whole monitoring period into a plurality of intervals, measuring means to which said converting means and said dividing means are connected for measuring said digital value of each of said digital signals appearing during each of said intervals, and recording means connected to said measuring means for recording the results produced by said measuring means so that the results thus recorded can be reproduced for analytical purposes whenever desired.

4. An apparatus as claimed in claim 3 wherein said converting means includes individual rectifier circuits for rectifying the respective analog signals, individual integrator circuits connected to the respective rectifier circuits for integrating the DC components of the output signals from said rectifier circuits, individual level detector circuits connected to the respective integrator circuits for detecting whether the output from the corresponding integrator circuits exceeds a predetermined value and for generating an output signal when said output from the integrator exceeds said predetermined value, and individual resetting means connected between the respective level detector circuits and corresponding integrator circuit for resetting said individual integrator circuits in response to output signals from said corresponding level detector circuits.

5. An apparatus as claimed in claim 3 in which said recording means is a magnetic tape recorder.

6. An apparatus as claimed in claim 3 in which said measuring means comprises individual storing means for storing at the end of each interval the digital value of the respective digital signals, pulse train generating circuit means connected to said storing means for generating individual trains of pulses corresponding to the contents stored in the respective storing means, and gate control circuit means for transmitting to said recording means said individual trains of pulses as a sequence of serially spaced pulse trains.

7. An apparatus as claimed in claim 6 in which said recording means comprises means for recording said sequence of pulse trains in a single channel whereby the pulse trains thus recorded can be reproduced for analytical purposes whenever desired.

8. An apparatus for monitoring behavior during sleep which comprises a plurality of electrodes adapted to be detachably secured on portions of the body of a living organism for detecting analog signals representative of electroencephalograms, movements of the eyes and electromyograms, respectively, converting means connected to said electrodes for converting said analog signals into digital signals, each of said digital signals having a digital value substantially corresponding to the amplitude of the corresponding one of said analog signals, dividing means for dividing the whole monitoring period into a plurality of intervals, meansuring means to which said converting means and said dividing means are connected for measuring said digital value of each of said digital signals appearing during each of said intervals, pulse train generating means connected to said measuring means for generating individual trains of pulses corresponding to the digital value of said digital signals and transmitting said pulse trains as a sequence of serially spaced pulse trains, and recording means connected to said pulse train generating means for recording the sequence of pulse trains so that said pulse trains can be reproduced for analytical purposes whenever desired.

9. An apparatus for monitoring behavior during sleep which comprises a plurality of electrodes adapted to be detachably secured on portions of the body of a living organism for detecting analog signals representative of electroencephalograms, movements of the eyes and electromyograms, respectively, converting means connected to said electrodes for converting said analog signals into digital signals, each of said digital signals having a digital value substantially corresponding to the amplitude of the corresponding one of said analog signals, dividing means for dividing the whole monitoring period into a plurality of intervals, measuring means to which said converting means and said dividing means are connected for measuring said digital value of each of said digital signals appearing during each of said intervals, pulse train generating means connected to said measuring means for generating individual trains of pulses corresponding to the digital value of said digital signals and transmitting said pulse trains as a sequence of serially spaced pulse trains, transferring means connected to said pulse train generating means for transferring said serially spaced pulse trains into a sequence of audio freqency signal trains with the trains of signals corresponding to the respective analog signals having different frequencies, and recording means connected to said transferring means for recording the sequence of audio frequency signal trains so that said signal trains can be reproduced for analytical purposes whenever desired.

10. An apparatus as claimed in claim 9 wherein said transferring means comprises an audio signal generating circuit for generating signals having different frequencies within the audible frequency range, individual switching devices coupled to the audio signal generating circuit and to a common output for switching signals of different audio frequencies therefrom, the respective individual switching devices being coupled to said pulse generating means for receiving respective pulse trains in sequence from said pulse generating means for switching trains of different frequency audio frequency signals in sequence to said common output.

11. An apparatus as claimed in claim 10 in which said recording means comprises a magnetic tape recorder, and said dividing means being coupled to said tape recorder for intermittently driving said tape recorder in such a way that said recorder is operated at the end of each interval of the monitoring period and is placed in an inoperative state upon completion of such recording.

* * * * *